United States Patent [19]

Kaye

[11] 4,288,756

[45] Sep. 8, 1981

[54] $CO_2$ LASER

[75] Inventor: Alan S. Kaye, Wantage, England

[73] Assignee: United Kingdom Atomic Energy Authority, London, England

[21] Appl. No.: 915,284

[22] Filed: Jun. 13, 1978

[30] Foreign Application Priority Data

Jun. 17, 1977 [GB] United Kingdom .............. 25510/77

[51] Int. Cl.³ .............................................. H01S 3/02
[52] U.S. Cl. .......................... 331/94.5 G; 331/94.5 D
[58] Field of Search .................... 331/94.5 G, 94.5 M, 331/94.5 D, 94.5 PE

[56] References Cited

U.S. PATENT DOCUMENTS

| 3,577,096 | 5/1971 | Bridges et al. | 331/94.5 PE |
| 3,720,885 | 3/1973 | Koloc | 331/94.5 G |
| 3,970,962 | 6/1976 | Peressini et al. | 331/94.5 PE |
| 3,995,189 | 11/1976 | Haslund | 331/94.5 G |

Primary Examiner—William L. Sikes
Assistant Examiner—Leon Scott, Jr.
Attorney, Agent, or Firm—Larson, Taylor and Hinds

[57] ABSTRACT

A transverse flow gas discharge laser in which the cathode has an elongated cross-section the larger dimension of which is positioned at an angle to the direction of flow of the gaseous lasing medium. The anode of the laser is of modular construction and consists of an array of individually ballasted cylindrical buttons. Both the anode and the cathode are so positioned that they intereact aerodynamically with the adjacent duct wall to produce a stable electric discharge between them.

10 Claims, 2 Drawing Figures

U.S. Patent
Sep. 8, 1981
4,288,756
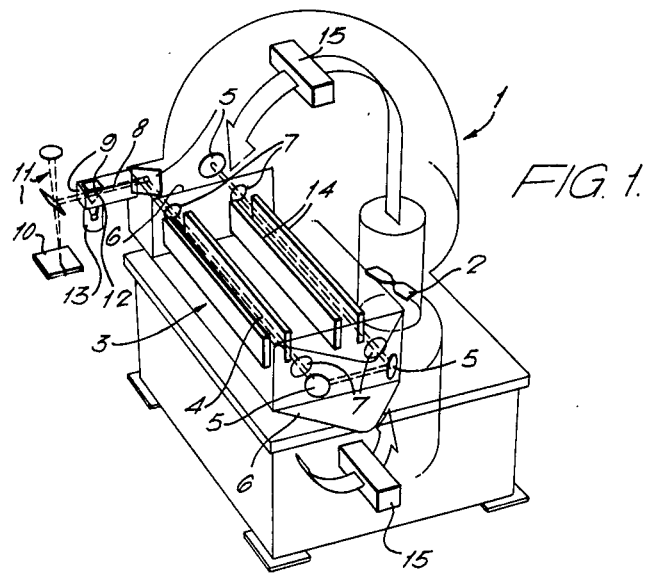
FIG. 1.
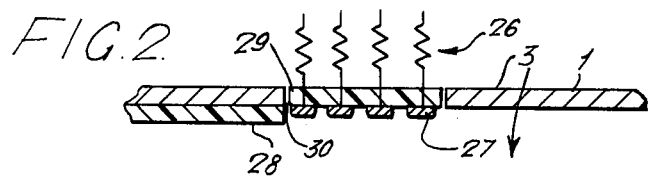
FIG. 2.
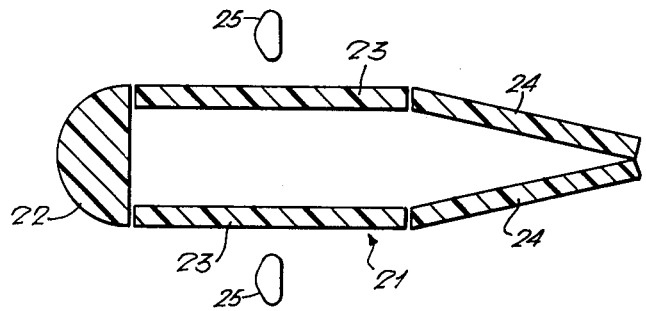
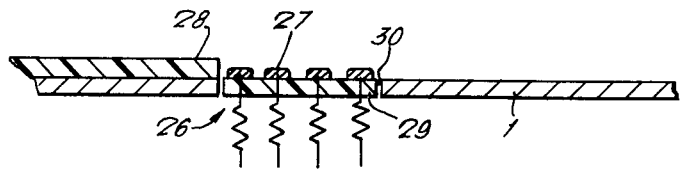

CO₂ LASER

The present invention relates to transverse flow gas discharge lasers, and in particular to high power transverse flow gas discharge lasers incorporating carbon dioxide in the lasing medium.

A major problem in the operation of high power transverse flow gas discharge lasers is the maintenance of a stable exciting electric discharge within the gaseous lasing medium. Various designs of electrode systems have been proposed to this end. For example, one design of high power transverse flow gas discharge laser has a circularly cylindrical cathode electrode extending across a rectangular duct close to one of the walls of the duct, and a parallel anode electrode consisting of a plurality of individual plane conducting pads flush-mounted in the opposite wall of the duct and somewhat downstream of the cathode electrode. The arrangement is such that the gas flow through the region of the duct in which the electrodes are situated, and in particular over the anode is laminar, but a region of turbulence exists in the wake of the cathode electrode.

According to the present invention there is provided a transverse flow gas discharge laser comprising, a closed system of ducting including a region of rectangular cross-section adapted to act as a laser cavity, means for circulating a gaseous medium through the system of ducting, an anode electrode situated at one side of the said region of the system of ducting and extending transversely of the said region and parallel to the optic axis thereof, and a cathode electrode opposite the anode electrode parallel thereto, wherein the electrodes are so shaped and mounted in relation to the respective walls of the said region of the system of ducting (which is also so shaped) that in use the walls of the said region of ducting interact aerodynamically with the electrodes to stabilize an electric discharge existing between them.

According to the invention in one aspect, the cathode electrode has an elongated cross-section and is positioned with its major transverse dimension at an angle to the direction of flow of the lasing medium and is situated at a distance from the adjacent wall of the said region of the system of ducting such that the proximity of the wall of the said region of the system of ducting modifies the gas flow over the cathode in such a manner as to assist in the stabilisation of the cathode flare which occurs during operation of the laser.

Preferably, the cathode electrode is in the form of a flattened tube having a generally triangular cross-section with an aspect ratio of about 2:1, and is mounted with its larger cross-sectional dimension at an angle of between approximately 45 and 120 degrees to the direction of flow of the lasing medium.

The diameter of the tube from which the cathode is made is dependent upon the operating pressure of the lasing medium, for example, for a laser designed to operate at a pressure in the region of 50 torr, a tube of original diameter of $\frac{3}{8}''$ is satisfactory. Operation at higher pressure requires a smaller cathode, and vice versa.

The distance separating the cathode from the adjacent duct wall is a function of the gas flow rate, as well as the gas pressure. For a flow rate of about 50 m/sec and a pressure of about 50 torr, a separation of between 7 and 12 mm is suitable.

According to the invention in another aspect, the anode electrode comprises an array of close-packed smoothly contoured metal buttons electrically isolated from one another and each connected to a respective ballasting means and adapted to be mounted in the wall of the said region of the system of ducting, the wall of the ducting having a region immediately upstream of the anode when it is in position which is adapted to cause the gaseous medium to flow over the anode electrode in a turbulent manner. For example, there may be included a plate upstream of the anode of a thickness such that it projects further into the gas stream than do the metal buttons forming the anode electrode, the trailing edge of the plate causing turbulence in the flowing gaseous medium as it passes over the anode electrode.

The anode electrode may be divided into modules each of which can be inserted into or withdrawn from the said region of the system of ducting without disturbing neighbouring modules.

The invention will now be described, by way of example, with reference to the accompanying drawings in which, FIG. 1 is a diagrammatic representation of a high power gas laser embodying the invention, and FIG. 2 is a diagrammatic representation of a cross-section of a part of the laser.

Referring to FIG. 1 of the drawings, a high power transverse flow gas discharge laser consists of a closed system of ducting 1, which is indicated schematically, through which a gaseous lasing medium consisting of a mixture of carbon dioxide, nitrogen and helium such as is well-known in the laser art, can be circulated by means of a fan 2. A section of the ducting 1, shown generally by the reference numeral 3, has a rectangular cross-section and is adapted to act as an optical cavity 4, in which lasing action can take place, by means of a system of mirrors, 5. The mirrors 5 are situated in gas-tight housings 6, which are in communication with the system of ducting 1 by means of water-cooled beam-defining apertures 7. The mirrors 5, however, are mounted on an optical bench which is supported on flexible mountings in a manner such that it is in a state of dynamic equilibrium and vibrations of, and/or, any dimensional changes in the system of ducting 1 are not communicated to the mirrors 5 with consequent effects upon the stability of the optical cavity 4. The optical bench is not shown. The mirrors 5 are made of a copper alloy, the reflecting surfaces being gold-plated. The mirrors 5 have cooling channels formed in them through which water can be circulated. The cooling channels are formed by drilling holes in the bodies of the mirrors 5 and then brazing on copper end plates to form manifolds at the sides of the mirrors 5. The mirror assemblies are then heat-treated to harden the surfaces which are to form the reflecting surfaces of the mirrors 5. The beam of radiation generated by the laser leaves the apparatus via a water-cooled output window 9 made of zinc selenide. The beam 8 is then directed onto a work piece 10 by means of an optical system 11. A hinged mirror 12 is included which enables the beam 8 to be diverted into a calorimeter 13 so that its power level can be determined.

The gaseous lasing medium is excited by means of a d.c. discharge which is established between two sets of electrodes 14 situated in the section 3 of the ducting 1. The electrodes 14 are only indicated schematically in FIG. 1; they are described more completely later with reference to FIG. 2.

The system of ducting 1 also incorporates two heat exchangers 15 and a flow controlling device, which is not shown, which ensures that the gaseous lasing medium has a constant velocity and a uniform small scale turbulence as it passes through the region 3 of the system of ducting 1. A suitable flow controlling device is a screen with an appropriately sized mesh.

Referring to FIG. 2, which is a diagrammatic cross-section of the section 3 of the system of ducting 1 in which the lasing action takes place, the section 3 of the system of ducting 1 is divided longitudinally into two identical regions 3a by means of a central structure 21 which is omitted from FIG. 1 for purposes of clarity, and consists of a semi-cylindrical leading edge 22, two parallel portions 23 and two inclined portions 24. The structure 21 approximates to a streamline shape so as not to cause distortions in the flow pattern of the gaseous lasing medium. It is made of a ceramic material such as that known as Pyroceram. Each of the portions of the structure 21 has mounted upon it a cathode electrode 25. The cathode electrodes 25 are hollow so that cooling water can be circulated through them and have an elongated cross-section with substantially flat sides and rounded edges. The cross-section of the cathodes 25 is an obtuse triangle with rounded corners. This form increases the mechanical stiffness of the cathodes 25. If other configurations of laser are used, with the gas flow horizontal instead of vertical, then this extra stiffness may not be required and the cathode electrodes 25 may be of a simpler form with parallel sides. The ratios of the major and minor cross-sectional dimensions of each of the cathode electrodes 25 is approximately 2:1. The size of the cathodes 25 is dependent on the operating pressure of the laser; for a laser in which the gaseous lasing medium flows through the section 3 of the system of ducting at a pressure of some 50 torr, the cathode electrodes 25 conveniently can be made by deforming a copper tube of $\frac{3}{8}''$ external diameter. The cathode electrodes 25 are mounted parallel to the optic axis of the optical cavity 4 with their major cross-sectional dimensions at right angles to the direction of gas flow, although they can be positioned with their major cross-sectional directions within a range of 45° to 120° to the direction of gas flow. The apices of the triangles forming the cross-sections of the cathodes 25 point upstream of the gas flow.

The profile and orientation of the cathode electrodes 25 within the stated limits result in an increased area and reduced overall current density in the cathode flare which occurs in operation, compared with a circularly cylindrical cathode, and an increase in the stability of the cathode flare.

Each of the cathode electrodes 25 is mounted some 10 mm from the adjacent portion 23 of the structure 21. The precise distance of the cathode electrodes 25 from the respective portions 23 of the structure 21 is dependent upon the actual orientation of the cathode electrodes 25, the velocity of flow of the gaseous lasing medium and its pressure. For a laser operating at a pressure of 50 torr, and a gas flow rate of about 50 m/sec, distances of about 7–12 mm can be used.

With the gas parameters described, the surfaces of the portions 23 of the structure 21 modify the gas flow over the cathode electrodes 25 so as to stabilize the cathode flares associated with the electrodes. If the cathode electrodes 25 are positioned further from the adjacent portion 23 of the structure 21, the cathode flares constrict laterally into high current channels at lower levels of electrical power input to the gas discharge. If the cathode electrodes 25 are positioned closer to the adjacent portion 23 of the structure 21, the cathode flare regions become highly turbulent and less favourable to the maintenance of high levels of electrical power gas discharges.

The form of cathodes described has the important operational feature that, at lower current levels in the operating gas discharge, such that the cathode glow does not cover the whole of the surface areas of the cathode electrodes 25, the cathode glows spread longitudinally in preference to circumferentially.

It is thus possible to maintain a uniform discharge in the gaseous lasing medium at a low level of input power with the cathode glow covering less than the full area of the cathodes 25. If the power level is then increased, with the gas pressure remaining constant, the cathode glow spreads evenly from the bottom of the cathodes 25 until it covers the entire operative areas of the cathodes 25.

Thus, at constant pressure, satisfactory operation can be achieved over a wide range of power input levels.

Each anode electrode 26 consists of a close-packed array of smoothly contoured, axi-symmetric buttons 27 made of a metal such as nickel or copper. The precise shape of the buttons 27 is not critical. The maximum input power increases approximately as the inverse of the distance between the buttons 27; dimensions which have been found to be suitable for the laser being described are: diameter 12 mm, height 6 mm, radius of edges 3 mm. Each button 27 is connected to an associated resistor, and possibly an inductor. The close-packing arrangement gives maximum surface area, and thus minimum current density, whilst the smooth profile avoids sharp edges which may cause locally intense flares.

Upstream of the buttons 27, forming each anode electrode 26, is a ceramic plate 28 which aero-dynamically stabilizes the gas discharge in the regions of the anode electrodes 26. The plates 28 are so positioned that their trailing edges are some 0.5 mm proud of the upper surfaces of the buttons 27 forming the anode electrodes 26. Such positioning leads to a favourable interaction between the resulting turbulent gas flow over and between the buttons 27 and the gas discharge, which allows substantially higher input power levels to be used than can be used if the gas flow over the anode electrodes 26 is not turbulent.

The buttons 27 are mounted on ceramic plates 29, a number of which go to make up each anode electrode 26. The plates 29 are attached to carriers, which are not shown, which incorporate peripheral O-ring gas seals so that when the anode electrodes 26 are inserted through holes 30 in the wall of the ducting 1, the system of ducting 1 remains gas tight.

The modular construction of the anode electrodes 26 enables the effective areas of the electrodes of the laser to be varied if desired, and also facilitates the maintenance of the laser, it being necessary to change only an effected module in the event of failure rather than the whole of the relevant anode electrode 26.

I claim:

1. A transverse flow gas discharge laser comprising, a closed system of ducting including a region of rectangular cross-section, means for forming an optical resonant cavity including said region, means for abstracting energy from said optical resonant cavity, means for circulating a gaseous lasing medium unidirectionally through the system of ducting, a cathode electrode situated adjacent to and spaced from one wall of the said region of ducting and extending parallel thereto, the cathode electrode also extending transversely of the direction of flow of the lasing medium and parallel to the optic axis of the optical cavity, an anode electrode at the other side of the said region of ducting opposite the cathode electrode and extending parallel thereto, the cathode electrode having a non-circular cross-section and being mounted such that the lasing medium surrounds the cathode electrode, the separation between the cathode electrode and the adjacent wall of the said region of ducting being such that, in use, distortions in the flow of the flowing lasing medium in the neighborhood of the adjacent wall of the said region of ducting interact with the cathode electrode to stabilize a cathode flare which forms in operation of the laser and hence to stabilize an associated electric discharge between the electrodes.

2. A laser according to claim 1 wherein the cathode electrode has an elongated cross-section and is positioned with the major transverse dimension thereof at an angle to the direction of flow of the lasing medium.

3. A laser according to claim 2 wherein the major and minor transverse cross-section dimensions of the cathode have a ratio of approximately 2:1 and the cathode is mounted with its larger cross-sectional dimension at an angle of between 45 and 120 degrees to the direction of flow of the gaseous lasing medium.

4. A laser according to claim 3 wherein the cathode electrode is in the form of a tube having a generally triangular cross-section.

5. A laser according to claim 1 wherein the cathode electrode is positioned between 7 and 12 mm from the adjacent duct wall.

6. A laser according to claim 1 wherein the anode electrode comprises an array of close-packed smoothly contoured metal buttons electrically isolated from one another, each said button being connected to a respective ballasting means and being mounted in a wall of the said region of the system of ducting, the wall of the ducting including flow affecting means, disposed immediately upstream of the anode in the direction of flow of said gaseous lasing medium, for causing the gaseous lasing medium to flow over the anode electrode in a turbulent manner.

7. A laser according to claim 6 wherein the said flow affecting means includes a step of a height as to protrude further into the gas stream than do the metal buttons forming the anode electrode, so that the trailing edge of the step causes turbulence in the gaseous lasing medium as the medium passes over the anode electrode.

8. A laser according to claim 6 wherein the anode electrode is divided into modules each of which can be inserted into or withdrawn from the system of ducting without disturbing neighboring modules.

9. A laser according to claim 1 wherein the said region of the ducting is divided into two by a central structure to form two identical corresponding regions each of which has a cathode electrode and an anode electrode, the cathode electrodes being mounted adjacent the central structure and the anodes being situated in respective walls of the ducting opposite the cathode electrodes.

10. A laser according to claim 1 wherein there is provided means for producing uniform small-scale turbulence within the gaseous lasing medium as the medium enters the said region of the ducting in which lasing action takes place.

* * * * *